United States Patent
Zou et al.

(10) Patent No.: US 12,418,233 B2
(45) Date of Patent: Sep. 16, 2025

(54) BOOST INDUCTOR RECIRCULATION PROTECTION BASED ON SWITCH NODE DETECTION METHOD

(71) Applicant: Cypress Semiconductor Corporation, San Jose, CA (US)

(72) Inventors: Qiong Zou, Singapore (SG); Soon Hwei Tan, Singapore (SG)

(73) Assignee: Cypress Semiconductor Corporation, San Jose, CA (US)

(*) Notice: Subject to any disclaimer, the term of this patent is extended or adjusted under 35 U.S.C. 154(b) by 309 days.

(21) Appl. No.: 18/322,419

(22) Filed: May 23, 2023

(65) Prior Publication Data

US 2024/0063719 A1 Feb. 22, 2024

Related U.S. Application Data

(60) Provisional application No. 63/399,359, filed on Aug. 19, 2022.

(51) Int. Cl.
*H02M 1/36* (2007.01)
*H02M 1/00* (2007.01)
(Continued)

(52) U.S. Cl.
CPC ........... *H02M 1/36* (2013.01); *H02M 1/0006* (2021.05); *H02M 3/33507* (2013.01); *H02M 1/32* (2013.01); *H02M 3/156* (2013.01)

(58) Field of Classification Search
CPC ................ H02M 1/0006; H02M 1/36; H02M 3/155–1588; H02M 3/335–33592
See application file for complete search history.

(56) References Cited

U.S. PATENT DOCUMENTS

| | | | | |
|---|---|---|---|---|
| 8,289,731 B2 * | 10/2012 | Spiridon | ............... | H02M 3/335 363/21.16 |
| 2020/0127575 A1 * | 4/2020 | Liu | ............... | G06F 1/266 |

OTHER PUBLICATIONS

"UCC28782 High-Density Active-Clamp Flyback Controller with EMI Dithering, X-Cap Discharge, and Bias Power Management", Texas Instruments Incorporated, May 2020—Revised May 2021, 98 pages.

* cited by examiner

*Primary Examiner* — Fred E Finch, III (57) ABSTRACT

Systems and methods are provided to supply a voltage (Vcc) to a primary IC in a switch-mode-power-supply following startup. Briefly, an input voltage ($V_{IN}$) coupled through a boost-inductor to a switch-pin of the IC is sensed by isolating a DC component ($V_{DC\_BSW}$) of the voltage and checking if $V_{IN}$ is greater than a minimum $V_{IN}$ ($V_{IN\_MIN}$) by comparing $V_{DC\_BSW}$ to a starting reference voltage ($V_{REF\_START}$) in the IC. If $V_{DC\_BSW}$ is greater than $V_{REF\_START}$, a boost-switch in the IC through which the switch-pin is coupled to ground is cycled on and off to alternately store and discharge energy in the boost-inductor, boosting Vcc. Thereafter, $V_{IN}$ is checked against a maximum input voltage by comparing $V_{DC\_BSW}$ to a reference voltage ($V_{REF}$), greater than $V_{REF\_START}$, and if $V_{DC\_BSW}$ is greater than $V_{REF}$, boost is turned off by turning off and ceasing to cycle the boost-switch, protecting the boost-inductor from current runaway.

20 Claims, 6 Drawing Sheets

(51) Int. Cl.
*H02M 1/32* (2007.01)
*H02M 3/156* (2006.01)
*H02M 3/335* (2006.01)

BOOST INDUCTOR RECIRCULATION PROTECTION BASED ON SWITCH NODE DETECTION METHOD

CROSS-REFERENCE TO RELATED APPLICATIONS

This application is claims the benefit of priority under 35 U.S.C. 119(e) to U.S. Provisional Patent Application Ser. No. 63/399,359, filed Aug. 19, 2022, which is incorporated by reference herein in its entirety.

TECHNICAL FIELD

This disclosure relates generally to switch-mode power supplies, and more particularly to universal serial bus power delivery (USB-PD) power supply and methods of operating the same to provide stable power to a primary integrated circuit in a controller thereof.

BACKGROUND

Universal Serial Bus Power Delivery (USB-PD) power supplies are one type of a switch-mode power supply (SMPS) designed for a wide range of output power applications. For example, USB-PD applications satisfying Standard Power Range (SPR) specifications can provide voltages from 3.3V to 20V with output powers up to 100 W, and applications satisfying Extended Power Range (EPR) standards can provide voltages up to 48V with output powers up to 240 W.

Figure 1A:
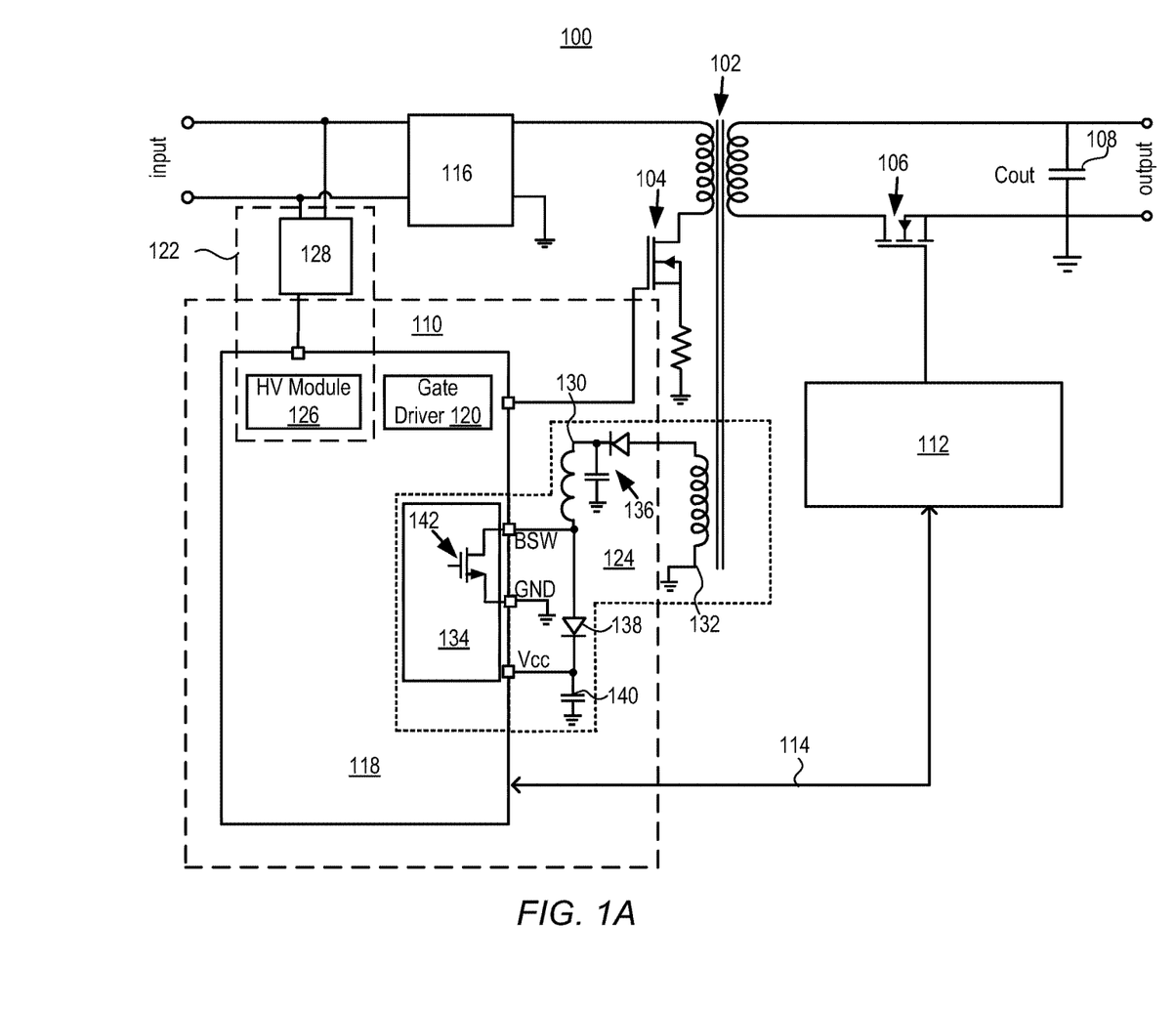
FIG. 1A is a simplified schematic block diagram illustrating a switch mode power supply (SMPS) including a primary side controller having a primary integrated circuit (IC) powered by a conventional primary supply circuit following an initial startup.

FIG. 1A shows a schematic of one type of SMPS suitable for use as a USB-PD adapter known as a fly-back converter 100. Briefly, the fly-back converter 100 includes a transformer 102, a first rectifying element or power switch (PS 104), on a primary side of the transformer, and a second rectifying element, such as a synchronous rectifier (SR) field effect transistor (SR_FET 106) on a secondary side of the transformer coupled between the transformer 102 and a secondary output capacitor 108 across which an output voltage is generated. The fly-back converter 100 further includes a primary side controller 110 coupled to a gate of the PS 104 and a secondary side or SR controller 112 coupled to a gate of the SR_FET 106.

When the PS 104 is closed the primary side of the transformer is connected to a voltage source coupled to the input and resulting in a primary current and magnetic flux, storing energy in the transformer 102. When the PS 104 is opened by the primary side controller 110 and the SR_FET 106 is closed by the SR controller 112, the energy stored in the transformer generates a secondary current, recharging the capacitor 108 supplying an output voltage to the output. Generally, the converter further includes a feedback circuit or signal path 114, such as a pulse width transformer, coupled between the primary side controller 110 and the secondary side controller 112 to synchronize operation of the PS 104 and SR_FET 106 and to turn on or off the PS based on the voltage or power required on the output capacitor 108.

The fly-back converter 100 can be used in both AC/DC and DC/DC conversion. Where an AC input voltage is used as the voltage source, the fly-back converter 100 further includes a rectifying circuit, such as a bridge rectifier 116, coupled between the voltage source and the input.

In certain embodiments, such as that shown, the primary side controller 110 is implemented partly or wholly as an integrated circuit or primary IC 118. The primary IC 118 includes a gate driver 120 coupled to the gate of the PS 104 and is operable to turn the PS on and off. Typically, the primary side controller 110 further includes a startup circuit 122 to provide a startup voltage to power the primary IC 118 directly from the input during a softstart of the fly-back converter, and a primary supply circuit 124 to provide a supply voltage (Vcc) to the primary IC from an input voltage ($V_{IN}$) which is proportional to a voltage generated on the secondary side of the transformer upon completion of the softstart.

The startup circuit 122 includes a high voltage (HV) startup circuit or module 126 in the primary IC 118 coupled to the input of the fly-back converter 100 to provide power at a proper voltage to the primary IC. Where, as in the embodiment shown, the voltage source supplied to the input of the fly-back converter 100 is an AC voltage source, the startup circuit 122 further includes a number of diodes or rectifying elements 128 coupled between the input and the HV module 126 to provide a high DC voltage to the HV module.

The primary supply circuit 124 generally includes a boost-inductor 130 coupled between an auxiliary winding 132 of the transformer 102 and through a boost-switch pin (BSW-pin) to a boost controller 134 in the primary IC 118. A first end or terminal of the boost-inductor 130 is coupled to the auxiliary winding 132 through a low pass filter 136 formed by a capacitor and a diode, and a second end or terminal is coupled to the BSW-pin. The second terminal of the boost-inductor 130 is further coupled to a voltage supply-pin (Vcc-pin) in the primary IC 118 through a diode 138 connected between the BSW-pin and Vcc-pin, and to ground through a capacitor 140 connected between the Vcc-pin and ground. The boost controller 134 includes a boost-switch 142 through which the BSW-pin can be coupled to a boost ground pin (BGND-pin) to lower a voltage ($V_{BSW}$) on the BSW-pin and a store energy in the boost-inductor 130. The boost controller 134 is operable to cycle the boost-switch 142 on and off to store energy in the boost-inductor 130 when the boost-switch is on and to boost the voltage supplied to the Vcc-pin when the switch is off.

Figure 1B:
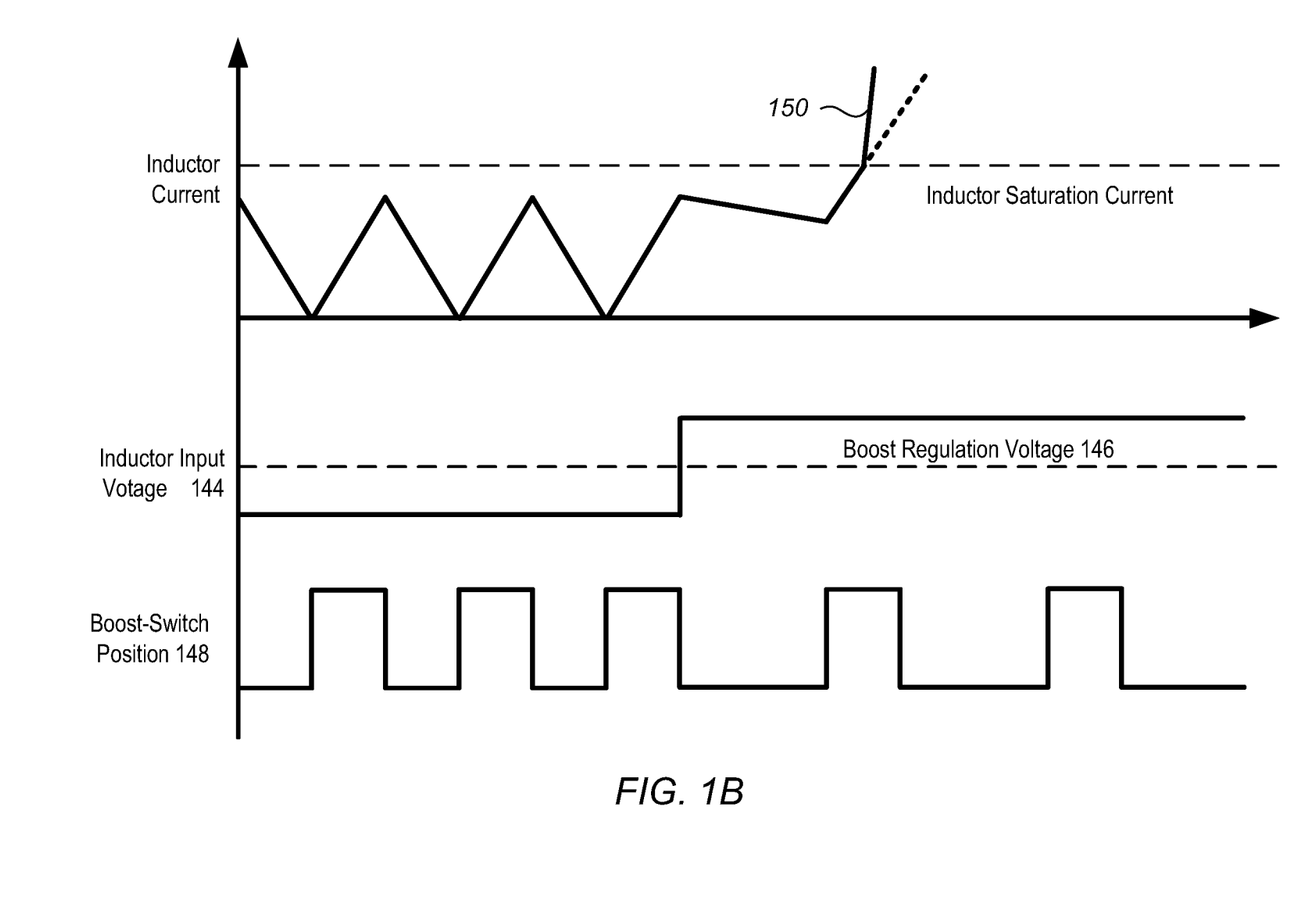
FIG. 1B are graphs illustrating input voltage to and current through a boost-inductor in the conventional boost converter of FIG. 1A.

Referring to FIG. 1B, one problem with previous generations of fly-back converters, such as that shown in FIG. 1A, is that as an input voltage ($V_{IN}$ 144) from the auxiliary winding 132 approaches and exceeds a boost converter regulation voltage 146 provided by the boost-controller 134 and boost-inductor 130, the time for which the boost-switch 142 is off (illustrated by line 148) is increased, which causes inductor current (illustrated by line 150) to recirculate and not fully discharge leading to current runaway and possible damage to the boost-inductor 130 and/or primary IC 118 when an inductor saturation current is exceeded. In addition, if $V_{IN}$ is insufficiently high, efficiency of boost would become very low and thus enabling boost regulator would in-turn wasting system energy.

Past approaches to solving the above problem have required additional connections to the auxiliary winding 132 and internal sensing circuitry to sense $V_{IN}$, resulting in the need for additional-pins on the primary IC 118 increasing a die-size of the primary IC, and increasing quiescent currents as a result of the additional sensing circuitry.

Accordingly, there is a need for a primary supply circuit and methods for providing power to a primary IC in a SMPS or USB-PD that is capable of sensing input voltages ($V_{IN}$) and protecting the boost-inductor and primary IC from damage due to current runaway as well as enabling boost only when input voltage ($V_{IN}$) is sufficiently high for optimum boost efficiency. It is further desirable that the circuit and method are able to do so without increasing the quiescent current, and size or complexity of the primary side controller.

SUMMARY

A primary supply circuit including a boost converter and methods for operating the same to provide power to a primary integrated circuit (IC) in a switch mode power supply (SMPS), such as a Universal Serial Bus power delivery (USB-PD) charger or adapter are disclosed. Briefly, the method begins after softstart of the SMPS with sensing an input voltage ($V_{IN}$) coupled through a boost-inductor to a switch-pin of the IC and through a rectifier or diode from the BSW-pin to a voltage supply-pin (Vcc-pin). The Vcc-pin is further coupled to ground through a capacitor to generate a supply voltage (Vcc) on the Vcc-pin. $V_{IN}$ is checked to determine if $V_{IN}$ greater than or equal to a minimum input voltage ($V_{IN\_MIN}$). Generally, $V_{IN}$ is sensed by isolating a DC component ($V_{DC\_BSW}$) of a switching voltage ($V_{BSW}$) on the BSW-pin, and comparing $V_{DC\_BSW}$ to a starting reference voltage ($V_{REF\_START}$) in the primary IC. If $V_{DC\_BSW}$ is greater than or equal to $V_{REF\_START}$, a boost-converter is operated to turn on boost or boost-mode by cycling a boost-switch in the primary IC through which the BSW-pin is coupled to ground on and off to alternately store and discharge energy in the boost-inductor, boosting Vcc. If $V_{IN}$ is not greater than or equal to $V_{IN\_MIN}$, the boost-converter is operated to confirm that boost is turned off by operating the boost-converter to turn off the boost-switch, while powering the primary IC with a startup circuit, and repeating checking if $V_{IN}$ is greater than or equal to $V_{IN\_MIN}$.

After turning on boost $V_{IN}$ is checked to determine if it has risen to greater than or equal to a maximum input voltage ($V_{IN\_MAX}$) by comparing $V_{DC\_BSW}$ to another reference voltage ($V_{REF}$) in the primary IC, where $V_{REF}$ is greater than $V_{REF\_START}$, and if $V_{DC\_BSW}$ is greater than or equal to $V_{REF}$, the boost-converter is operated to turn off boost by turning off and ceasing to cycle the boost-switch on and off, protecting the boost-inductor from damage due to current runaway. After the boost has been turned off $V_{IN}$ is checked to determine if $V_{IN}$ has decreased to less than or equal to a $V_{IN}$ under voltage level ($V_{IN\_UV}$), and if $V_{IN}$ has decreased to less than or equal $V_{IN\_UV}$, $V_{IN}$ is again checked to determine if it is greater than or equal $V_{IN\_MIN}$, and if $V_{IN}$ is greater than or equal $V_{IN\_MIN}$ boost is turned back on by resuming cycling the boost-switch on and off.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

DETAILED DESCRIPTION

A system and methods are provided for supplying stable power to a primary integrated circuit (IC) in a switch-mode power supply (SMPS), such as a Universal Serial Bus power delivery (USB-PD) application following an initial startup. Briefly, the system and method are based on preventing damage to a boost-inductor in a boost-converter by sensing an over voltage on a boost-switch node or pin (BSW-pin) without the need for any additional-pins.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to couple as used herein may include both to directly electrically connect two or more components or elements and to indirectly connect through one or more intervening components.

Figure 2A:
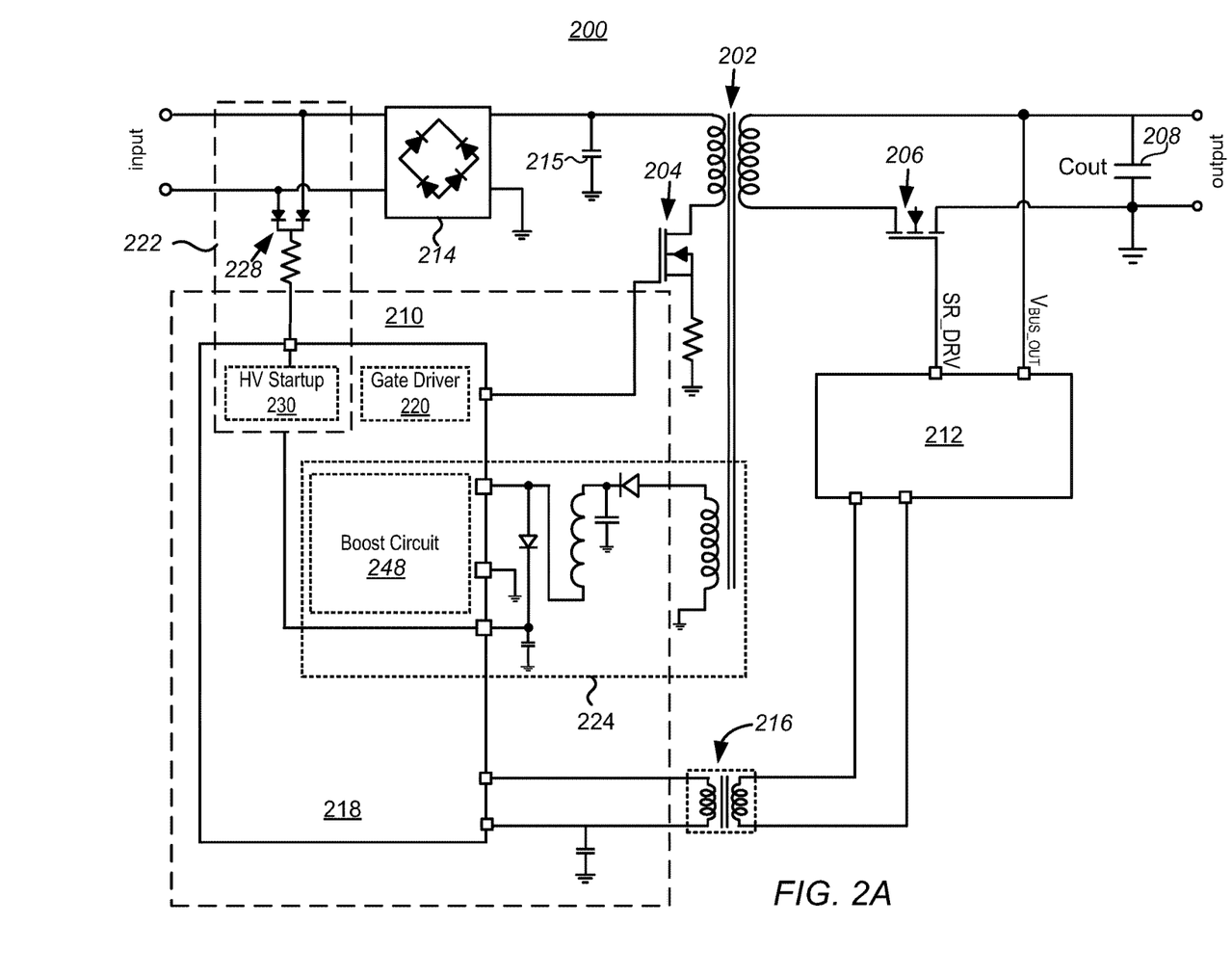
FIG. 2A is a schematic block diagram illustrating a SMPS including a primary IC powered following an initial startup by a boost-converter according to the present disclosure.

An embodiment of a system for supplying power to a primary IC in a SMPS following an initial startup by a primary supply circuit including or consisting of a boost converter will now be described with reference to FIGS. 2A and 2B. FIG. 2A is a schematic block diagram illustrating one type of a SMPS particularly useful in a USB-PD adapter or charger, and including a fly-back converter with a primary IC powered following an initial startup by a primary supply circuit including a boost converter.

Referring to FIG. 2A, the fly-back converter 200, and includes a transformer 202, a first rectifying element or power switch (PS 204), such as a metal-oxide-silicon field effect transistor (MOSFET), on a primary side of the transformer, a second rectifying element, such as a synchronous rectifier (SR) field effect transistor (SR_FET 206), coupled between a secondary side of the transformer and as secondary output capacitor 208, a primary side controller 210 coupled to a gate of the PS 204, and a secondary side controller 212 coupled to a gate of the SR_FET 206. The input voltage to the converter can include either an AC input voltage or a sinusoidal DC input voltage coupled to the primary side of the transformer 202 through a rectifying circuit, such as a bridge rectifier 214, and across a primary input capacitor 215 as in the embodiment shown. A pulse transformer 216 coupled between the primary side controller 210 and the secondary side controller 212 provides a pulse width modulated (PWM) signal based on a DC voltage or power required on the output capacitor 208 to turn on or off the PS 204.

In certain embodiments, such as that shown, the primary side controller 210 is implemented partly or wholly as an integrated circuit or primary IC 218. The primary IC 218 includes a gate driver 220 coupled to the gate of the PS 204 and is operable to turn the PS on and off in response to the PWM signal. In these embodiments the fly-back converter 200 typically further includes a startup circuit 222 to provide a startup voltage and power primary IC 218 during a softstart of the fly-back converter, and a primary supply circuit or boost-converter 224 to provide a supply voltage (Vcc) to the primary IC 218 following an initial softstart of the fly-back converter using the startup circuit 222 after a DC voltage has built-up on the secondary output capacitor 208.

The startup circuit 222 is coupled to input terminals of the fly-back converter 200, a number of diodes or rectifying elements 228 coupled to the primary input, and a high voltage (HV) startup circuit or module 230 in the primary IC 218.

Figure 2B:
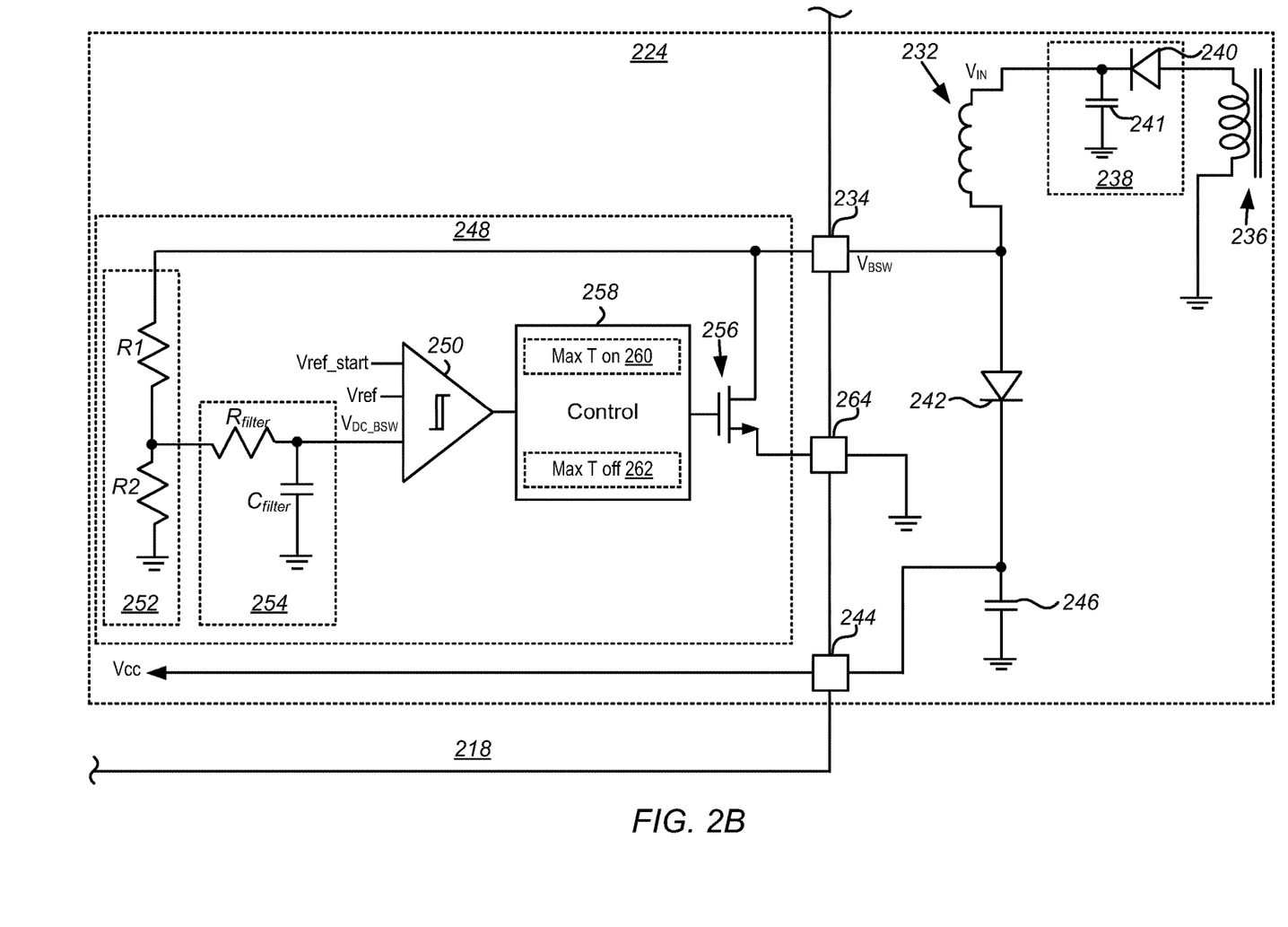
FIG. 2B is a schematic block diagram illustrating the boost-converter of FIG. 2A.

FIG. 2B is a more detailed diagram of the boost-converter 224 of FIG. 2A. Referring to FIG. 2B the boost-converter 224 includes a boost-inductor 232 coupled between a voltage input and a boost-switch node or switch-pin (BSW-pin 234) of the primary IC 218. The boost-inductor 232 is operable to receive an input voltage ($V_{IN}$) from the voltage input and couple a switching voltage ($V_{BSW}$) to the BSW-pin 234. In the embodiment shown, the voltage input is provided by an auxiliary winding 236 of the transformer 202 coupled to the boost-inductor 232 through a first low pass filter 238 formed by a diode ($D_{filter}$ 240) and a capacitor ($C_{filter}$ 241). An external rectifier diode or rectifier 242 is coupled between the BSW-pin 234 and a voltage supply-pin (Vcc-pin 244), and the Vcc-pin further coupled to ground through an external capacitor 246 to provide a supply voltage (Vcc) to power the primary IC 218 after a DC voltage has built-up on the secondary output capacitor 208.

The boost-converter 224 further includes a boost-circuit 248 integrally formed in the primary IC 218. Generally, the boost-circuit 248 includes a comparator 250 with a non-inverting (+) input coupled to one or more internal reference voltages ($V_{REF}$ and $V_{REF\_START}$), an inverting (−) input coupled to the BSW-pin 234 through a voltage ladder or divider 252 formed by resistors R1 and R2 and a second low pass filter 254 formed by a resistor $R_{filter}$ and a capacitor $C_{filter}$ to receive a divided and filtered DC component ($V_{DC\_BSW}$) of $V_{BSW}$, and a boost-switch 256. As explained further below, the $V_{REF\_START}$ is a starting reference voltage used immediately following softstart of the fly-back converter 200 to determine $V_{DC\_BSW}$ is $\geq V_{REF\_START}$, and therefore $V_{IN}$ is greater than or equal to a minimum input voltage ($V_{IN\_MIN}$) required to begin cycling the boost-switch 256, while the $V_{REF}$ reference is used during boost-mode or boost-switch cycling is enabled or commenced to provide a boosted Vcc following softstart.

The boost-switch 256 is a transistor, such as an N-channel low side field effect transistor (NMOS LSFET), and has a gate coupled to an output of the comparator 250 through a gate driver or controller 258 by which is operable to turn the boost-switch alternately on and off in boost-mode, and to turn off and cease cycling the boost-switch to turn off boost-mode. The boost-switch 256 is operable when turned on to couple the BSW-pin 234 to ground through a boost-switch ground-pin (BGND-pin 264), lowering the switching voltage ($V_{BSW}$) on the BSW-pin and storing energy in the boost-inductor 232. When the boost-switch 256 is subsequently turned off, the boost-inductor 232 discharges boosting the switching voltage ($V_{BSW}$) on the BSW-pin 234 and supplied through rectifier 242 to the Vcc-pin 244.

Generally, the reference voltage, $V_{REF}$ is an o voltage selected based on an over-voltage protection level ($V_{OVP}$), and the comparator 250 is operable to output a signal to turn off the cycling of the boost-switch 256 when the divided and filtered DC component voltage of the voltage on the BSW-pin 234, is greater than or equal to the reference voltage, that is when $V_{DC\_BSW} \geq V_{REF}$, to protect the boost-inductor 232 from damage due to current runaway. The comparator 250 is further operable to output a signal to turn the cycling of the boost-switch 256 back on when $V_{IN}$ as dropped below a under-voltage level ($V_{IN\_UV}$), where $V_{IN\_UV}$ is selected to be higher than a minimum supply voltage ($Vcc_{MIN}$) for normal operation of the primary IC. In one embodiment, the boost-circuit 248 detects that $V_{IN}$ has dropped below $V_{IN\_UV}$ by detecting that $V_{DC\_BSW}$ is less than $V_{REF}$ by greater than or equal to an offset voltage ($V_{OFF}$).

In another embodiment, the comparator 250 is a Schmitt trigger comparator with a positive feedback loop from the output of the comparator to the non-inverting input, and the offset voltage is based on a hysteresis of the comparator.

In addition, the controller 258 further includes a maximum time on circuit (Max T on 260) to turn off the boost-switch 256 after it has been on for more than a maximum time on, and a maximum time off circuit (Max T off 262) to turn on the boost-switch 256 after it has been off for more than a maximum time off.

Figure 3:
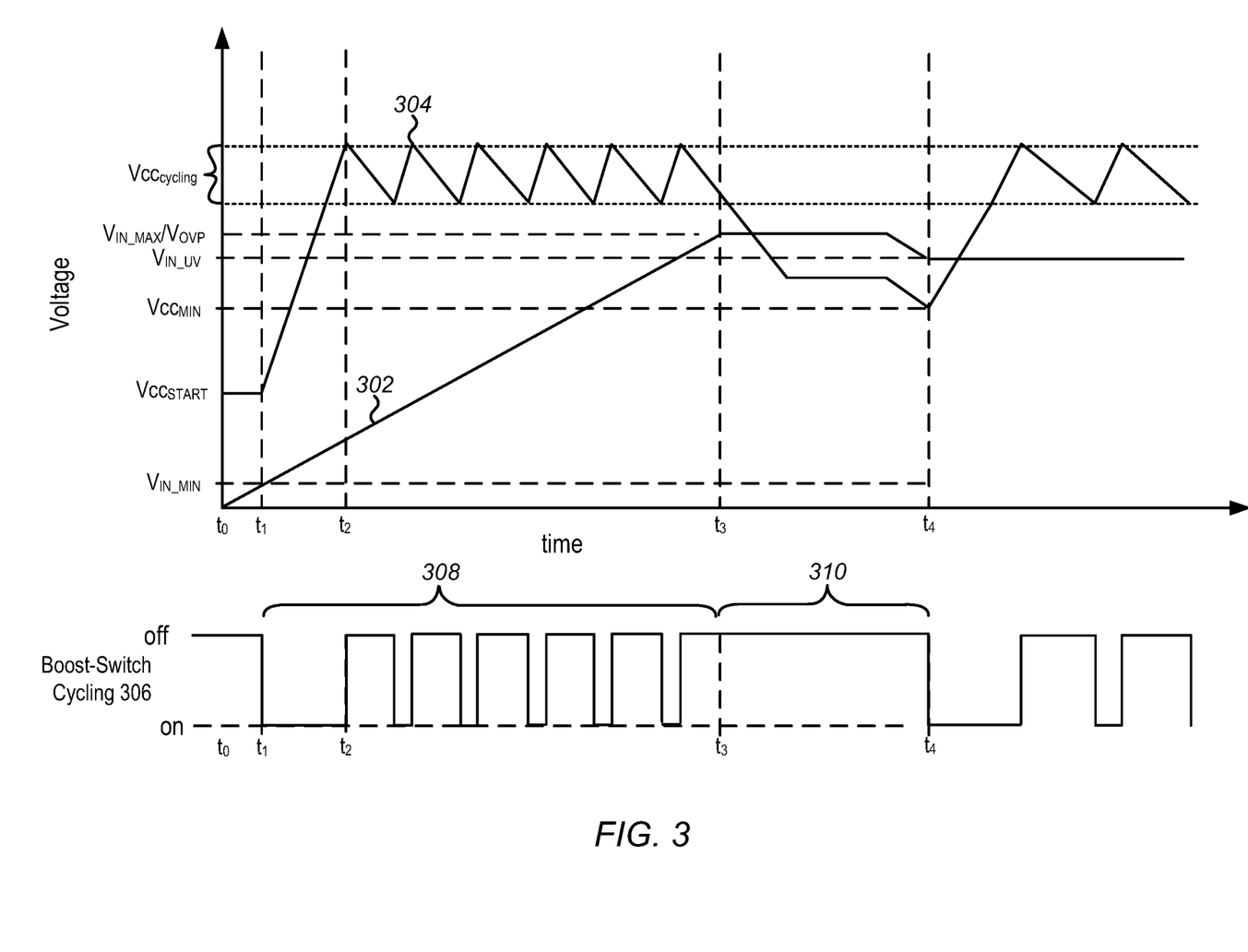
FIG. 3 are graphs illustrating input voltage ($V_{IN}$) and a supply voltage (Vcc) supplied to a primary IC by boost-converter of FIGS. 2A and 2B following an initial startup.

FIG. 3 includes graphs illustrating input voltage ($V_{IN}$) and a supply voltage (Vcc) supplied to a primary IC by boost-converter of FIGS. 2A and 2B following an initial startup, and a corresponding timing diagram showing times for which the cycling of the boost-switch 256 is turned on and off. Referring to FIG. 3, between time t0 and time t1 $V_{IN}$ 302 is increasing, Vcc 304 is equal to a start voltage ($Vcc_{START}$) supplied by the HV startup module 230, and the boost-switch cycling 306 is off to while waiting for $V_{IN}$ to rise to greater than or equal to a minimum voltage level ($V_{IN\_MIN}$) required to enable operation of the boost-converter 224.

At time t1 $V_{IN}$ has risen to $V_{IN\_MIN}$ ($V_{IN} \geq V_{IN\_MIN}$), boost-switch cycling 306 begins and Vcc 304 begins to rise. Generally, determining $V_{IN}$ is greater than or equal to $V_{IN\_MIN}$ is accomplished by comparing $V_{DC\_BSW}$ to $V_{REF\_START}$. A portion 308 of the line illustrating boost-switch cycling 306 indicates times during which the boost-switch cycling is turned on, with the boost-switch 256 being alternately turned on and off to boost Vcc.

From time t1 to t3 boost-switch cycling 306 is turned on with Vcc cycling beginning at time t2 as a result of the normal operation of the boost-converter 224, and while $V_{IN}$ continues to rise as the output of the fly-back converter 200 rises.

At time t3 $V_{IN}$ has risen to a maximum voltage level ($V_{IN\_MAX}$), which is selected to be equal to an over voltage protection ($V_{OVP}$) to protect the boost-inductor 232 from damage due to current runaway. The boost-circuit 248 detects $V_{IN} \geq V_{IN\_MAX}$ by sensing $V_{DC\_BSW}$ is greater than or equal to $V_{REF}$, and turns off the boost-switch cycling 306 by turning off and ceasing to cycle the boost-switch 256. A portion 310 of the line illustrating boost-switch cycling 306 indicates times during which the boost-switch cycling is turned off, with the boost-switch 256 being turned off and ceasing to be cycled.

From time t3 to time t4 Vcc 304 is maintained by $V_{IN}$ 302 through rectifier 242. When during operation of the fly-back converter 200 $V_{IN}$ 302 and therefore Vcc 304 begin to drop due to a drop either in an input voltage to or output voltage from the fly-back converter, the boost-circuit 248 detects $V_{IN}$ is less than or equal to $V_{IN\_UV}$ by sensing $V_{DC\_BSW}$ is less than $V_{REF}$ by more than the offset voltage, and at time t4 the boost-circuit 248 turns the boost-switch cycling 306 back on by resuming or resuming cycling the boost-switch 256 on and off.

Figure 4:
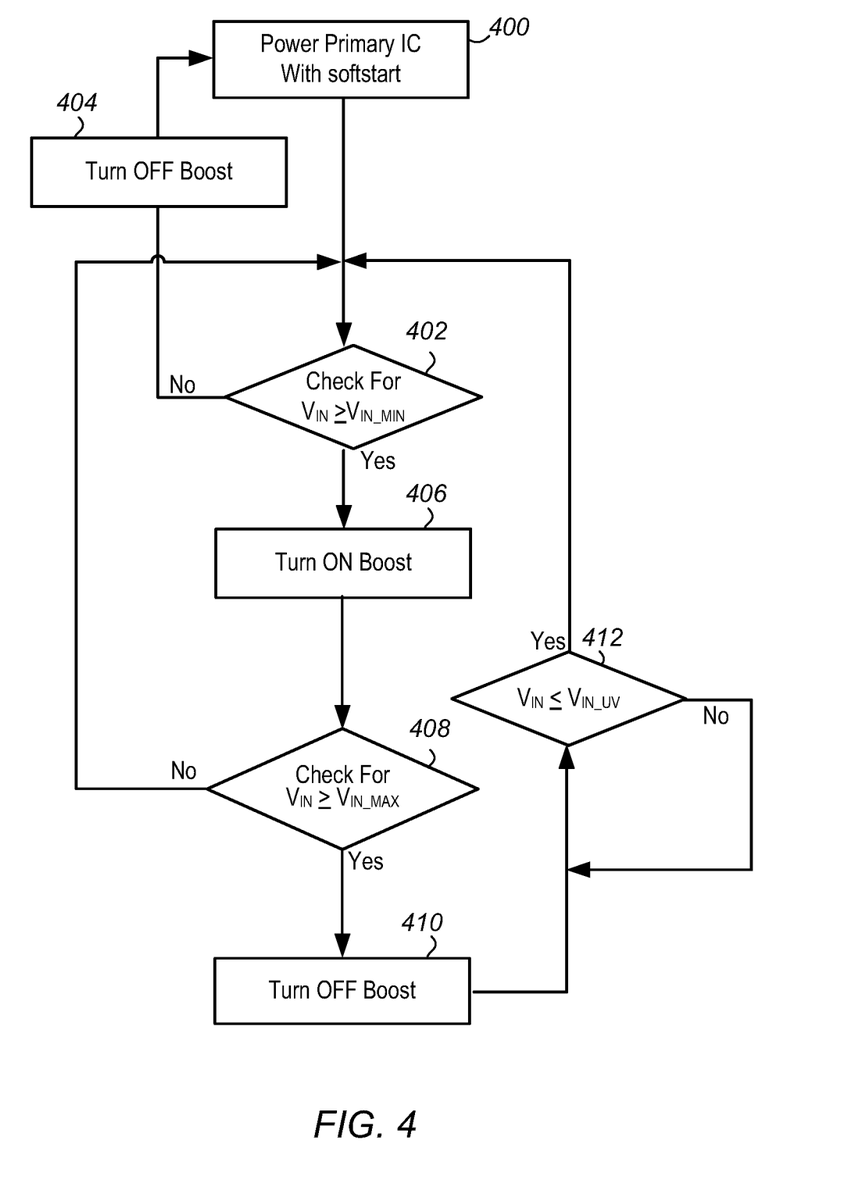
FIG. 4 is a flowchart illustrating a method for supplying stable power to a primary IC in a SMPS following an initial startup.

FIG. 4 is a flowchart illustrating a method for operating a primary supply circuit of a SMPS, such as the fly-back converter 200 shown in FIG. 2A and including the boost-converter 224 shown in FIG. 2B, to provide a stable supply voltage (Vcc) or power to the primary IC 218 following an initial startup powered by the HV startup circuit 222.

Referring to FIG. 4, the method begins with performing a softstart to power the primary IC directly from the input to the SMPS (softstart, step 400). This is generally accomplished using the startup circuit 222 including rectifying elements 228 coupled across input terminals to the primary, and the HV startup module 230 in the primary IC 218.

Next, a check is preformed to determine if an input voltage ($V_{IN}$) has been coupled to the boost-inductor 232 of the boost-converter 224 and is greater than a minimum input voltage ($V_{IN\_MIN}$, step 402). As noted above, checking for $V_{IN}$ can be accomplished by dividing and filtering the voltage ($V_{BSW}$) on the BSW-pin 234 using the internal voltage divider 252 and low pass filter 254 in the primary IC 218 to isolate a DC component ($V_{DC\_BSW}$) of $V_{BSW}$ and determining if $V_{DC\_BSW}$ is greater than or equal to a reference start voltage ($V_{REF\_START}$). If $V_{IN}$ is not present ($V_{IN}<V_{IN\_MIN}$), boost-switch cycling is turned off or maintained off (Turn OFF Boost, step 404), and the softstart continues with the startup circuit 222 providing power to the primary IC 218 directly from the input to the flyback converter 200, while repeating the check for $V_{IN}$. If $V_{IN}$ is present, the boost or the boost-circuit 248 is turned on by operating the control 258 cycling the boost-switch 256 on and off to alternately store and discharge energy in the boost-inductor to boost Vcc (Turn ON Boost, step 406). It is noted that a switching frequency at which the boost-switch 256 is turned on and off is generally based on $V_{IN}$, and that the switching frequency increases at lower $V_{IN}$ and decreases with higher $V_{IN}$.

Next, while continuing to operate the boost-converter 224 in boost-mode by cycling the boost-switch 256 on and off, a check is preformed to determine if $V_{IN}$ is greater than or equal to a maximum voltage level ($V_{IN\_MAX}$, step 408). This can be accomplished, for example, by sensing and comparing $V_{DC\_BSW}$ to $V_{REF}$. Because $V_{REF}$ is selected based on an input voltage over-voltage protection level ($V_{OVP}$), which is selected to protect the boost-inductor from damage due to current runaway, if $V_{DC\_BSW}$ is greater than $V_{REF}$, the current through the boost-inductor 232 could damage the boost-inductor 232. If $V_{DC\_BSW}$ is not greater than $V_{REF}$, then $V_{IN}$ is not greater than or equal to $V_{IN\_MAX}$, and the boost-switch cycling is maintained on with the boost-switch 256 continuing to be cycled on and off, while repeating steps 402 to 406. If $V_{DC\_BSW}$ is greater than or equal to $V_{REF}$ the boost-switch cycling is turned off by turning off and ceasing to cycle the boost-switch 256 (Turn OFF Boost, step 410).

Next, a check is preformed to determine if $V_{IN}$ has dropped to or below a under voltage level ($V_{IN\_UV}$) ($V_{IN}<V_{IN\_UV}$, step 412). As noted above, this can be accomplished by sensing that $V_{DC\_BSW}$ is more than an offset voltage ($V_{OFF}$) below $V_{REF}$, or by a hysteresis of the comparator based on the $V_{IN\_UV}$ and offset voltage. If $V_{IN}$ has dropped to or below $V_{IN\_UV}$, the steps of the above method, i.e., steps 402 to 412, are repeated beginning with determining if $V_{IN}$ is present to turn the boost-circuit 248 back on by resuming cycling of the boost-switch 256.

If $V_{IN}$ has not dropped below $V_{IN\_UV}$ the boost-circuit 248 is maintained off with the boost-switch 256 off, while repeating the check to determine if $V_{IN}$ has dropped to or below $V_{IN\_UV}$).

Thus, systems for supplying stable power to a primary IC in a SMPS following an initial startup, and methods of operating the same to protect a boost-inductor and the primary IC from damage due to current runaway, without increasing the size, complexity and/or cost of a primary side controller have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method of operating a switch mode power supply (SMPS), the method comprising:
    following an initial startup of the SMPS, sensing an input voltage ($V_{IN}$) coupled through a boost-inductor to a switch pin (BSW-pin) of a primary integrated circuit (IC) in the SMPS by isolating a DC component ($V_{DC\_BSW}$) of a switching voltage ($V_{BSW}$) coupled to the BSW-pin;
    checking if $V_{IN}$ is greater than or equal to a minimum input voltage ($V_{IN\_MIN}$) by comparing $V_{DC\_BSW}$ to a starting reference voltage ($V_{REF\_START}$) in the primary IC; and
    if $V_{DC\_BSW}$ is greater than or equal to $V_{REF\_START}$:
        operating a boost-converter to turn on boost-mode by cycling a boost-switch in the primary IC through which the BSW-pin is coupled to ground on and off to alternately store and discharge energy in the boost-inductor; and
        boosting a supply voltage (Vcc) to a Vcc-pin of the primary IC coupled to the BSW-pin and boost-inductor through a rectifier and to ground though a capacitor on which Vcc is generated.

2. The method of claim 1 wherein if $V_{IN}$ is not greater than or equal to $V_{IN\_MIN}$ the method comprises confirming the boost-mode is turned off by operating the boost-converter to turn off the boost-switch, while powering the primary IC with a startup circuit, and repeating checking if $V_{IN}$ is greater than or equal to $V_{IN\_MIN}$.

3. The method of claim 1 further comprising after turning on boost-mode checking if $V_{IN}$ is greater than or equal to a maximum input voltage ($V_{IN\_MAX}$) by comparing $V_{DC\_BSW}$ to a reference voltage ($V_{REF}$) in the primary IC, where $V_{REF}$ is greater than $V_{REF\_START}$, and if $V_{DC\_BSW}$ is greater than or equal to $V_{REF}$, the method further comprises operating the boost-converter to turn off boost-mode by turning off and ceasing to cycle the boost-switch on and off.

4. The method of claim 3 further comprising after turning off boost-mode, checking if $V_{IN}$ has decreased to less than or equal to a $V_{IN}$ under voltage level ($V_{IN\_UV}$), and if $V_{IN}$ has decreased to less than or equal $V_{IN\_UV}$, the method further comprises checking if $V_{IN}$ is greater than or equal $V_{IN\_MIN}$, and if $V_{IN}$ is greater than or equal $V_{IN\_MIN}$ turning boost-mode back on by resuming cycling the boost-switch on and off.

5. The method of claim 4 wherein checking to determine if $V_{IN}$ has decreased to less than or equal to $V_{IN\_UV}$ comprises comparing $V_{DC\_BSW}$ to $V_{REF}$ and determining if $V_{DC\_BSW}$ is more than an offset voltage ($V_{OFF}$) below $V_{REF}$.

6. The method of claim 5 wherein if $V_{IN}$ has not decreased to less than or equal $V_{IN\_UV}$ the method further comprises repeating checking to determine if $V_{IN}$ has decreased to less than or equal to $V_{IN\_UV}$.

7. The method of claim 5 wherein comparing $V_{DC\_BSW}$ to $V_{REF}$ comprises coupling $V_{DC\_BSW}$ to an inverting input of a comparator in the primary IC while coupling $V_{REF}$ to a non-inverting input of the comparator, and wherein the $V_{OFF}$ is provided by a hysteresis of the comparator implemented by a positive feedback loop from an output of the comparator to the non-inverting input.

8. The method of claim 1 wherein comparing $V_{DC\_BSW}$ to $V_{REF\_START}$ comprises comparing $V_{DC\_BSW}$ to $V_{REF\_START}$ using a comparator in the primary IC, and wherein isolating $V_{DC\_BSW}$ comprises dividing and filtering $V_{BSW}$ using a voltage divider and a low pass filter in the primary IC through which the BSW-pin is coupled to an input of the comparator.

9. A boost-converter comprising:
a boost-inductor coupled between a voltage input and a boost-switch pin (BSW-pin) of a primary integrated circuit (IC) in a switch mode power supply (SMPS), the boost-inductor operable to receive an input voltage ($V_{IN}$) and couple a switching voltage ($V_{BSW}$) to the BSW-pin;
a voltage supply-pin (Vcc-pin) in the primary IC coupled to the BSW-pin and the boost-inductor through a diode, the Vcc-pin further coupled to ground through a capacitor to generate a supply voltage (Vcc) on the Vcc-pin; and
a boost-circuit in the primary IC coupled to the BSW-pin, and including a controller coupled to a boost-switch through which the BSW-pin is coupled to ground, the controller operable to turn on boost-mode by cycling the boost-switch on and off to alternately store energy in and discharge the boost-inductor boosting Vcc,
wherein the boost-circuit is further operable to sense $V_{IN}$, determine if $V_{IN}$ is greater than or equal to a maximum input voltage ($V_{IN\_MAX}$), and if $V_{IN}$ is greater than or equal to $V_{IN\_MAX}$ to protect the boost-inductor from damage due to current runaway by turning off boost-mode by turning off and ceasing to cycle the boost-switch.

10. The boost-converter of claim 9 wherein the boost-circuit further includes a comparator having an inverting input coupled to the BSW-pin through an internal voltage divider and a low pass filter, and a first non-inverting input coupled to an internal reference voltage ($V_{REF}$), and wherein the boost-circuit is operable to determine if $V_{IN}$ is greater than or equal to $V_{IN\_MAX}$ by isolating a DC component ($V_{DC\_BSW}$) of a switching voltage ($V_{BSW}$) on the BSW-pin by dividing and filtering $V_{BSW}$ using the voltage divider and low pass filter, and to compare $V_{DC\_BSW}$ to $V_{REF}$ using the comparator.

11. The boost-converter of claim 10 wherein the boost-circuit is further operable to sense if $V_{IN}$ has decreased to less than or equal to an under voltage level ($V_{IN\_UV}$) by determining if $V_{DC\_BSW}$ is greater than or equal to an offset voltage ($V_{OFF}$) below $V_{REF}$, and if $V_{IN}$ is less than or equal to $V_{IN\_UV}$ to sense if $V_{IN}$ is greater than or equal to a minimum input voltage ($V_{IN\_MIN}$), and if $V_{IN}$ is greater than or equal to $V_{IN\_MIN}$ to turn the boost-mode back on by resuming cycling the boost-switch on and off.

12. The boost-converter of claim 11 wherein the $V_{OFF}$ is based on a hysteresis of the comparator implemented by a positive feedback loop from an output of the comparator to the non-inverting input to provide the $V_{OFF}$.

13. The boost-converter of claim 10 wherein the comparator further comprises a second non-inverting input coupled to a starting reference voltage ($V_{REF\_START}$), and wherein the boost-circuit is further operable following an initial startup of the SMPS to sense if $V_{IN}$ is greater than or equal to a minimum input voltage ($V_{IN\_MIN}$), by determining if $V_{DC\_BSW}$ is greater than or equal to $V_{REF\_START}$, and to turn on boost-mode by cycling the boost-switch on and off to alternately store and discharge energy in the boost-inductor, boosting Vcc.

14. The boost-converter of claim 9 wherein the SMPS is a universal serial bus power delivery (USB-PD) power supply including a transformer comprising an auxiliary winding, and wherein the boost-inductor is coupled to an output of the auxiliary winding to receive $V_{IN}$ therefrom.

15. A switch mode power supply (SMPS) comprising:
a transformer including a primary side coupled to receive an input voltage and having a power switch (PS) coupled between the input voltage and the primary side, and a secondary side coupled to an output to provide an output voltage thereon;
a primary side controller operable to control the PS, the primary side controller including:
a primary integrated circuit (IC) having a switch pin (BSW-pin) and a voltage supply-pin (Vcc-pin) through which a supply voltage (Vcc) is supplied to power the primary IC; and
a boost-converter comprising:
a boost-inductor coupled between an auxiliary winding in the transformer and the BSW-pin, the boost-inductor operable to receive an input voltage ($V_{IN}$) and couple a switching voltage ($V_{BSW}$) to the BSW-pin;
a diode through which the Vcc-pin is coupled to the boost-inductor and the BSW-pin;
a capacitor through which the Vcc-pin is coupled to ground to generate Vcc; and
a boost-circuit in the primary IC coupled to the BSW-pin, and including a controller coupled to a boost-switch through which the BSW-pin is coupled to ground, the controller operable to turn on boost-mode by cycling the boost-switch on and off to alternately store energy in and discharge the boost-inductor boosting Vcc, wherein the boost-circuit is further operable to sense $V_{IN}$, determine if $V_{IN}$ is greater than or equal to a maximum input voltage ($V_{IN\_MAX}$), and if $V_{IN}$ is greater than or equal to $V_{IN\_MAX}$ to protect the boost-inductor from damage due to current runaway by turning off boost-mode by turning off and ceasing to cycle the boost-switch.

16. The SMPS of claim 15 wherein the boost-circuit further includes a comparator having an inverting input coupled to the BSW-pin through an internal voltage divider and a low pass filter, and a first non-inverting input coupled to an internal reference voltage ($V_{REF}$), and wherein the boost-circuit is operable to determine if $V_{IN}$ is greater than or equal to $V_{IN\_MAX}$ by isolating a DC component ($V_{DC\_BSW}$) of a switching voltage ($V_{BSW}$) on the BSW-pin by dividing and filtering $V_{BSW}$ using the voltage divider and low pass filter, and to compare $V_{DC\_BSW}$ to $V_{REF}$ using the comparator.

17. The SMPS of claim 16 wherein the boost-circuit is further operable to sense if $V_{IN}$ has decreased to less than or equal to an under voltage level ($V_{IN\_UV}$) by determining if $V_{DC\_BSW}$ is greater than or equal to an offset voltage ($V_{OFF}$) below $V_{REF}$, and if $V_{IN}$ is less than or equal to $V_{IN\_UV}$ to sense if $V_{IN}$ is greater than or equal to a minimum input voltage ($V_{IN\_MIN}$), and if $V_{IN}$ is greater than or equal to $V_{IN\_MIN}$ to turn the boost-mode back on by resuming cycling the boost-switch on and off.

18. The SMPS of claim 17 wherein the $V_{OFF}$ is based on a hysteresis of the comparator implemented by a positive feedback loop from an output of the comparator to the non-inverting input to provide the $V_{OFF}$.

19. The SMPS of claim 16 wherein the comparator further comprises a second non-inverting input coupled to a starting reference voltage ($V_{REF\_START}$), and wherein the boost-circuit is further operable following an initial startup of the SMPS to sense if $V_{IN}$ is greater than or equal to a minimum input voltage ($V_{IN\_MIN}$), by determining if $V_{DC\_BSW}$ is greater than or equal to $V_{REF\_START}$, and to turn on boost-mode by cycling the boost-switch on and off to alternately store and discharge energy in the boost-inductor, boosting Vcc.

20. The SMPS of claim 15 wherein the SMPS is a universal serial bus power delivery (USB-PD) power supply.

* * * * *